Jan. 15, 1952     D. H. CHADWICK     2,582,817
METHOD OF PRODUCING $C_1$-$C_3$ DIALKYL HYDROGEN PHOSPHITES
Filed Sept. 7, 1949     2 SHEETS—SHEET 1
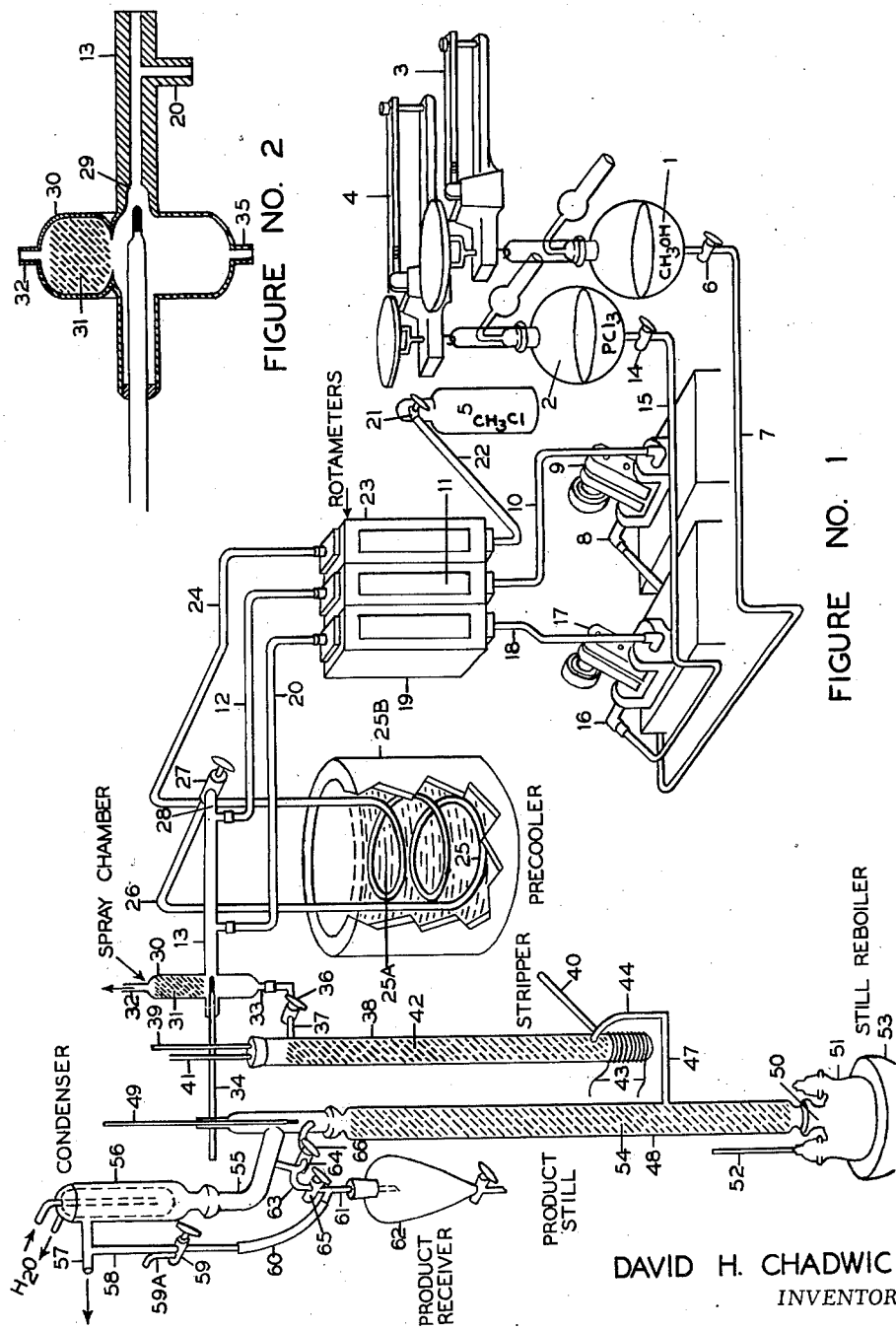
DAVID H. CHADWICK
INVENTOR.
BY *Elmer P. Rucker*
ATTORNEY Jan. 15, 1952     D. H. CHADWICK     2,582,817
METHOD OF PRODUCING $C_1-C_3$ DIALKYL HYDROGEN PHOSPHITES
Filed Sept. 7, 1949     2 SHEETS—SHEET 2

DAVID H. CHADWICK
INVENTOR.

BY Elmer Q. Rucker
ATTORNEY

Patented Jan. 15, 1952

2,582,817

UNITED STATES PATENT OFFICE 2,582,817

METHOD OF PRODUCING $C_1$–$C_3$ DIALKYL HYDROGEN PHOSPHITES

David H. Chadwick, Anniston, Ala., assignor to Monsanto Chemical Company, St. Louis, Mo., a corporation of Delaware Application September 7, 1949, Serial No. 114,372

13 Claims. (Cl. 260—461)

1

The present invention relates to dialkyl hydrogen phosphites containing from one to three carbon atoms and to a novel method of producing same.

An object of the invention is to provide an economically and commercially feasible method of producing the above compounds.

Another object is to provide a method of producing $C_1$–$C_3$ dialkyl hydrogen phosphites from phosphorus trichloride and the corresponding aliphatic alcohols in which the reaction is carried out substantially instantaneously.

A further object is to provide a continuous method of preparing $C_1$–$C_3$ dialkyl hydrogen phosphites from the above reactants, wherein the reaction temperature is controlled by internal cooling.

A still further object is to provide a method which results in the production of the $C_1$ to $C_3$ dialkyl hydrogen phosphites in substantially improved yields over conventional methods.

Other objects and advantages of the present invention will become apparent to those skilled in the art as the description proceeds.

The instant invention constitutes a decided improvement upon conventional methods of producing the $C_1$ to $C_3$ dialkyl hydrogen phosphites from phosphorus trichloride and the corresponding alcohols. Moreover, the present method can be carried out in relatively simple equipment and at a high rate of throughput.

In prior methods, it has been proposed to produce the $C_1$–$C_3$ dialkyl hydrogen phosphites by reacting the corresponding alcohols with phosphorus trichloride in a pot-type reactor wherein temperature control is effected by indirect cooling and by means of diluting solvents such as benzene. However, when the reactants are brought together en masse in this manner, it is difficult to achieve satisfactory mixing and contacting of the reactants and uniform temperature control with the result that hot spots tend to develop causing localized decomposition with correspondingly lower product yields. Thus, by the above methods, even with meticulous care and control, it has not been possible to consistently obtain a product yield in excess of 80% of theory, basis $PCl_3$. Moreover, they have the disadvantage of involving batch operations and of requiring unduly large and expensive equipment for large volume production and also agitators for mixing the reactants, which lead to excessive power requirements and mechanical troubles due to leakage through the stuffing box for the agitator shaft.

In accordance with the present invention, the reaction of the $C_1$–$C_3$ aliphatic alcohols with phosphorus trichloride is accomplished substantially instantaneously by mixing the reactants and an inert organic refrigerant in a short tubular nozzle and spraying or atomizing the resulting product into a collecting chamber which is preferably maintained at substantially atmospheric pressure. As a result of the exothermic heat generated by the alcohol-phosphorus trichloride reaction, evaporation of an equivalent amount of refrigerant occurs, thus accounting for the observed large pressure drop in the nozzle. The mixture comprising dialkyl hydrogen phosphite, hydrogen chloride and vaporized refrigerant leaving the nozzle at high velocity sprays into the collection chamber, which is designed to separate the finely divided ester from the vaporized refrigerant and undissolved hydrogen chloride gas. Any liquid refrigerant leaving the nozzle will evaporate in the collection chamber and will lower the temperature thereof, but will not materially affect the nozzle temperature. The products, namely, the $C_1$–$C_3$ dialkyl hydrogen phosphites, hydrogen chloride and the refrigerant, may thereafter be separated in any suitable manner.

For a more complete understanding of the instant invention, reference is made to the accompanying drawings, it being understood that modifications and variations in the equipment apparent to those skilled in the art may be made as desired without departing from the scope of the invention.

Figure 1 is a side elevational view, partly in section, of laboratory apparatus successfully used in practicing the present invention.

Figure 2 is an enlarged vertical sectional view of the spray or collecting chamber and nozzle used in Figure 1, showing their structure in greater detail.

Figure 3:
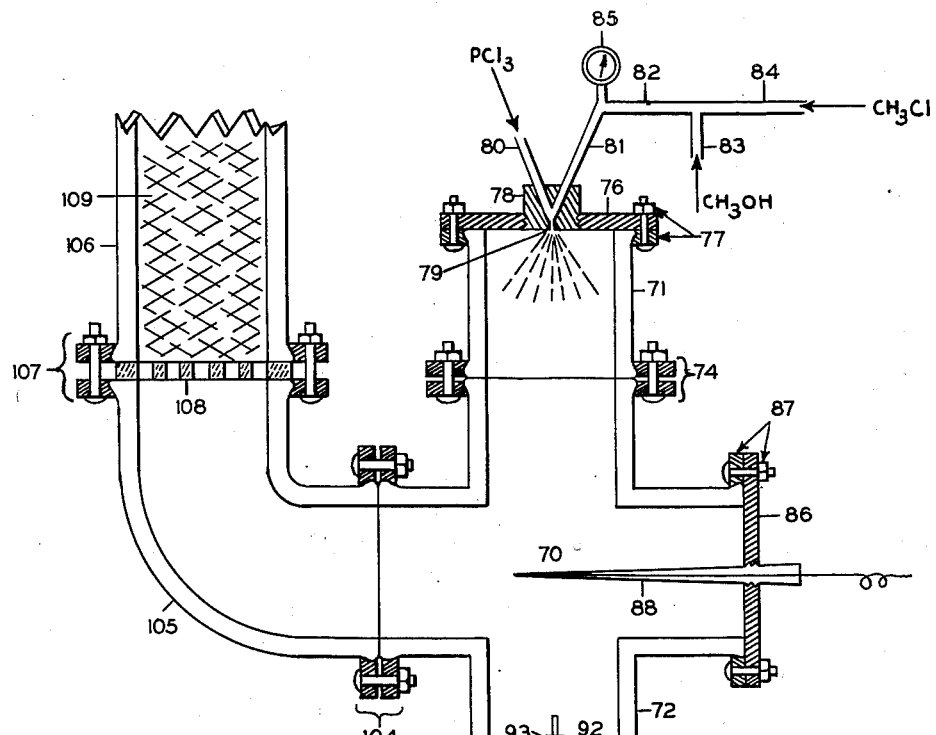
Figure 3 is a vertical sectional view of another embodiment of the invention, showing the spray nozzle, spray chamber, float valve, and auxiliary parts. In this view, the float valve is in the closed position.

Referring to Figures 1 and 2, reference characters 1 and 2 indicate flasks for containing a $C_1$-$C_3$ aliphatic alcohol, for example, methyl alcohol and phosphorus trichloride respectively and reference characters 3 and 4 are scales used for periodically weighing the above reactants.

Reference character 5 is a cylinder of a suitable refrigerant such as methyl chloride.

The alcohol flows from flask 1 via stopcock 6 into line 7 which leads to the intake 8 of a pump 9. The alcohol is then pumped by way of line 10 through rotameter 11 and from there by way of line 12 into spray nozzle 13.

The phosphorus trichloride is conveyed through stopcock 14 into line 15 which is connected to the intake 16 of pump 17. From pump 17, the phosphorus trichloride is passed via line 18, rotameter 19 and line 20 into nozzle 13.

The refrigerant is conducted through valve 21, line 22, rotameter 23, line 24, coils 25, line 26, valve 27 and line 28 into nozzle 13. The coils 25 are immersed in a cooling medium 25A contained in tank 25B wherein the refrigerant is precooled to the desired temperature.

The intimate mixture of alcohol, phosphorus trichloride and refrigerant is sprayed through the nozzle outlet 29 into chamber 30 which is provided with packing 31 to prevent entrainment of product by escaping vapors and gases, a vent 32 for discharging said vapors and gases from the system and a discharge line 33. The spray chamber 30 is also equipped with a thermometer 34 for indicating the temperature of the vapor-liquid mixture discharged from nozzle outlet 29.

The reaction product flows continuously at a controlled rate through line 33, valve 36 and line 37 into a stripping column 38. This column is equipped with thermometers 39 and 40 at the points indicated, vacuum connection 41 for maintaining the desired reduced pressure therein, Berl saddles or other suitable packing 42, an electrical heating coil 43 and a discharge line 44.

The electrical heating coil heats the dialkyl hydrogen phosphite at the bottom of the stripping column 38 so that the temperature progressively decreases from the bottom to the top thereof. This is important since the hydrogen chloride concentration progressively decreases from the top toward the bottom of the column and it is essential that the heat applied at the various points therein decrease as the hydrogen chloride concentration increases, otherwise substantial decomposition of the dialkyl hydrogen phosphite will occur. The heating of the stripping column at the bottom to a reboiler temperature corresponding to the boiling point of the product at the operating pressure results in essentially complete separation of hydrogen chloride and small amounts of refrigerant and unreacted materials from the dialkyl hydrogen phosphite.

The crude dialkyl hydrogen phosphite being substantially free of the foregoing impurities flows continuously at a controlled rate through lines 44 and 47 into the product still column 48 which is provided with a thermometer 49 and is attached by connection 50 to still pot 51, the latter being provided with a thermometer 52, and a suitable heating means 53. The still column 48 is provided with Berl saddles or other suitable packing 54 and a take off tube 55 leading to a condenser 56.

The condenser 56 has a vacuum connection 57 provided with a take off line 58 leading by way of stopcock 59 and lines 60 and 61 into product receiver 62. Stopcock 59 is provided with an outlet 59A so that the product receiver 62 may be connected to the atmosphere through lines 60 and 61. The condenser is also connected by stopcock controlled line 63 with the product receiver 62 and by a similarly controlled line 64 with the top of the still column 48. By regulating stopcocks 65 and 66 in lines 63 and 64 respectively, the amount of condensed product flowing to the product receiver or to the top of the column may be controlled, thus providing means for regulating the reflux ratio.

The still pot 51 is provided with a high boiling solvent such as phenylcyclohexane which facilitates distillation of the dialkyl hydrogen phosphite without substantial decomposition of the latter. This product, as hereinbefore indicated, is condensed in condenser 56 and recovered in product receiver 62; the high boiling solvent remains in the still pot 51 to be used over and over again.

The invention is illustrated but not limited by the following example. All parts are by weight.

Methyl alcohol, phosphorus trichloride and precooled methyl chloride were fed continuously to nozzle 13 and sprayed into chamber 30 at rates corresponding to 7.91, 5.57 and 18.5 parts per minute, respectively. This was done for 3 hours and 31 minutes during which time the vaporized methyl chloride maintained the reaction at a temperature of −20° C.

The resulting dimethyl hydrogen phosphite was continuously conducted into stripper 38 where hydrogen chloride, methyl chloride and unreacted materials were continuously removed by heating the crude product to a reboiler temperature of 99° C. while under an absolute pressure of 41 mm. of mercury.

The dimethyl hydrogen phosphite product being freed of the foregoing impurities was continuously charged into still pot 51 containing 200 parts of phenyl cyclohexane, from which substantially pure dimethyl hydrogen phosphite was continuously recovered by distillation at a temperature of 56° C. and an absolute pressure of about 11 mm. of mercury. A total of 1226 parts of dimethyl hydrogen phosphite was obtained which corresponds to a yield of 95% of theory, basis $PCl_3$.

The several runs given in the following table further illustrate conditions of operation under which satisfactory results from the standpoint of product yield are obtained. These runs were carried out in the above apparatus, the conditions differing in the manner indicated from those given in the foregoing specific example.

uct recovery and purification system (not shown) which includes a stripper for eliminating residual

Table

| Run No. | Total Time, Min. | Total Reactants | | | | Avg. Flow Rates, Parts By Wt./Min. | | | Avg. Pressures, mm. Hg | | |
|---|---|---|---|---|---|---|---|---|---|---|---|
| | | Parts By Wt. | | | Percent Molar Excess | | | | | | |
| | | PCl₃ | CH₃OH | CH₃Cl | CH₃OH | PCl₃ | CH₃OH | CH₃Cl | Reactor | Stripper | Still |
| 1 | 150 | 175 | 126 | 667 | 3 | 1.166 | 0.840 | 4.45 | 200 | 7 | 6 |
| 2 | 185 | 1,316 | 932 | 2,460 | 1 | 7.12 | 5.03 | 13.3 | 750 | 21 | 10 |
| 3 | 251 | 2,030 | 1,387 | 5,321 | −2 | 8.08 | 5.53 | 21.2 | 750 | 47 | 14 |
| 4 | 297 | 2,033 | 1,480 | 5,049 | 2 | 6.84 | 4.98 | 17.0 | 750 | 100 | 17 |

| Run No. | Avg. Temperatures, °C. | | | | | | | Product Parts By Wt., DMHP¹ (Distilled) | DMHP¹ Percent Yield |
|---|---|---|---|---|---|---|---|---|---|
| | Reactor | Stripper | | | Still | | | | |
| | | Top | Middle | Bottom | Bottom | Feed | Head | | |
| 1 | −41 | −6 | 27 | 47 | 105 | 60 | 48 | 125 | 89 |
| 2 | −10 | −17 | 29 | 70 | 110 | | 54 | 952 | 88 |
| 3 | −20 | <−40 | 63 | 98 | 126 | | 60 | 1,515 | 91 |
| 4 | −20 | −25 | 47 | 115 | 132 | | 64 | 1,485 | 89 |

¹ DMHP = dimethyl hydrogen phosphite.

Figure 4:
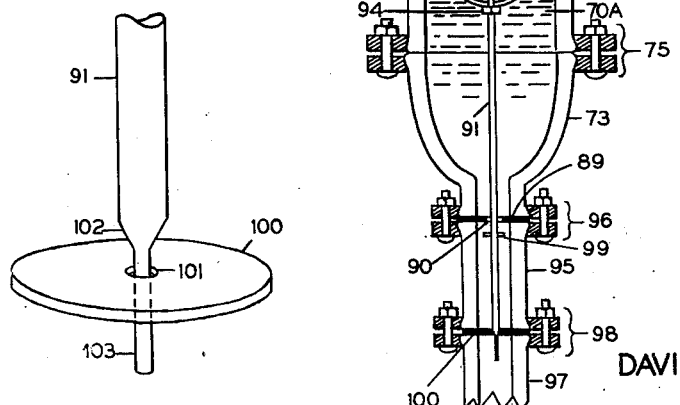
Figure 4 is a side elevational view of the valve stem and the perforated disc with which it cooperates to control the discharge of the reaction product from the spray chamber. In this view, the float valve is in the open position.

Referring to Figures 3 and 4, reference character 70 represents a spray or collection chamber composed of glass units 71, 72 and 73 secured together by clamping devices 74 and 75.

The top of unit 71 is covered by a closure disc 76 which is secured in position by a suitable clamping device 77. This disc carries a nozzle 78 having an orifice 79 which communicates with feed lines 80 and 81. The nozzle is supplied with phosphorus trichloride by way of line 80 and with an alcohol-refrigerant mixture by line 81, the latter being connected by line 82 to the alcohol and refrigerant feed lines 83 and 84 respectively. A pressure gage 85 is located at the juncture of lines 81 and 82 to indicate the pressure drop across nozzle 78.

Unit 72 is in the form of a cross and its component parts are circular in cross section. This unit is provided with a closure disc 86 which is secured in place by clamping means 87. This disc carries a thermocouple or another temperature sensitive device 88 which actuates an instrument which in turn automatically controls the temperature of the reaction by regulating the flow of refrigerant to the nozzle.

The bottom of unit 73 is closed by means of disc 89 having an opening 90 which serves as a guide for valve stem 91 and also as an outlet for the product. The valve stem 91 extends up into unit 72 and carries a spherical glass float 92 at a point near its upper end, the float being secured in position by nuts 93 and 94. The lower portion of the valve stem extends through unit 95 which is connected to 73 by clamping means 96, and also into unit 97 which is joined to unit 95 by a similar clamping means 98. At a point near the bottom of disc 89, the valve stem 91 is provided with a detent 99 which limits its upward movement as it is raised by float 92 due to the buoying action of the accumulated product.

At the juncture of units 95 and 97, a separating disc 100 is located containing an opening 101 which serves as a valve seat for the tapered portion 102 of valve stem 91, as a gide for the elongated portion 103 of the valve stem and also as a product discharge opening leading to a product hydrogen chloride and low boiling impurities, and a fractionating column and still pot for separating high boiling impurities.

Unit 72 is also connected by clamping means 104 to unit 105 which is in the form of an elbow of circular cross section and the latter in turn is attached to unit 106, also of circular cross section, by clamping means 107. Units 105 and 106 are separated by perforated plate 108 which serves as a support for Raschig rings or another suitable packing 109. The perforated plate permits hydrogen chloride, refrigerant and entrained product to pass through and the packing minimizes loss of the desired product while allowing hydrogen chloride and refrigerant to escape from the system.

In practicing the method of the instant invention in the above apparatus, the phosphorus trichloride, aliphatic alcohol and refrigerant are continuously supplied to nozzle 78 where they are intimately mixed and sprayed into chamber 70. The reactants are fed to the nozzle at rates providing substantially 3 moles of the alcohol to 1 of phosphorus trichloride, while the refrigerant is charged at a rate maintaining a temperature in the range of −41° C. and 5° C. and preferably in the range of −20° C. to −10° C. If the temperature rises above a predetermined value, the thermocouple 88 which is part of a system (not shown) regulating the refrigerant feed, effects an increase in the flow rate of the refrigerant and thus lowers the reaction temperature to the desired level; if the temperature falls below the above value, then the thermocouple reduces the flow rate of the refrigerant and raises the reaction temperature to the desired value.

The crude reaction product 79A accumulates in the bottom of the spray chamber 70 until the liquid level raises the float valve and permits the product to flow out of the system. The discharge of product from the spray chamber lowers the liquid level and causes the float valve to fall to the closed position, thus allowing the product to accumulate again. These operations are repeated continuously until the supply of reactants to the nozzle is discontinued.

The crude product discharged from the spray chamber is conducted continuously to a purification and recovery system (not shown) similar to the one described in connection with Figures 1 and 2. This system includes a stripper for continuously removing residual hydrogen chloride and low boiling impurities and a fractionating column and still pot for separating relatively high boiling impurities.

The vaporized refrigerant, hydrogen chloride and entrained dialkyl hydrogen phosphite pass through unit 105 and perforated disc 108 into packing 109, where the ester is separated and the vaporized refrigerant and hydrogen chloride are allowed to escape from the system, the ester being returned to the spray chamber. The hydrogen chloride is recovered in any well known manner and the refrigerant is recovered, recompressed, precooled and repeatedly returned to the process.

The following is an illustrative example of the method of practicing the present invention in the foregoing apparatus.

Methyl alcohol, phosphorus trichloride and precooled methyl chloride were fed continuously to nozzle 78 and sprayed into spray chamber 70 at average rates corresponding to 8.43, 11.71 and 31.6 lbs. per hour respectively. This operation was carried out for a period of 7 hours during which time the vaporized methyl chloride maintained the reaction temperature within the range of —11° C. to —8° C.

The resulting dimethyl hydrogen phosphite was continuously conducted to a stripper (not shown) wherein hydrogen chloride, methyl chloride and unreacted materials were continuously removed by heating the crude product to a reboiler temperature of about 103° C. while under an absolute pressure of about 133 mm. of mercury.

The dimethyl hydrogen phosphite product, after being freed of the foregoing impurities, was continuously charged to a combined fractionating column and still pot containing phenylcyclohexane, from which substantially pure dimethyl hydrogen phosphite was continuously recovered by distillation at a temperature of about 58° C. and an absolute pressure of about 22 mm. of mercury. A total of 61.0 lbs. of dimethyl hydrogen phosphite was obtained which corresponds to a yield of 93% of theory.

In carrying out the method of the instant invention, phosphorus trichloride and the $C_1$-$C_3$ aliphatic alcohols are reacted together in a molar ratio of substantially 3 moles of alcohol to 1 mole of the trichloride, but higher ratios may be used if desired. However, it is not desirable to use more than 10%, and preferably not more than 2% molar excess of the alcohol.

As to the temperature of the reaction, this may fluctuate widely so long as temperatures at which substantial decomposition of the desired dialkyl hydrogen phosphite are avoided. In general, the reaction temperature is maintained within the range of about —41° C. up to about 5° C. and within this range a temperature of about —10° C. to —20° C. is preferred.

The reaction temperature is controlled by spraying the reactants in intimate contact with an inert organic refrigerant which vaporizes and absorbs the heat of reaction. Any organic compound which is inert under the reactive conditions of the process and does not boil above 0° C. at atmospheric pressure may be used. Typical examples of these are methane; cyclopropane; isobutane; propane; methyl ether; carbon tetrafluoride; 1-chloro-1,1,-2,2-pentafluoro ethane; 1,1-dichloro-1,2,2,2 tetrafluoroethane; 1,1-difluoroethane; hexafluoroethane; 1,1,1-trifluoroethane; ethyl fluoride; fluoroform; isopropyl fluoride; chlorodifluoro methane; chlorotrifluoro methane; methyl chloride; difluoromethane; methyl fluoride; 2,2 difluoropropane; propyl fluoride; dichloro - difluoro methane; monochloro-tetrafluoro ethane; octafluoropropane; decafluorobutane; tetrafluoromethane and hexafluoroethane.

Of the foregoing refrigerants, methyl chloride is preferred since it is commercially available in the desired quantities. Moreover, its use in the production of dimethyl hydrogen phosphite is particularly advantageous since it is a product of the reaction and therefore does not further contaminate the product. Furthermore, it may be readily separated from the dimethyl derivative and repeatedly used and any losses of refrigerant which occur during such reuse are continuously replenished by further reaction between methyl alcohol and phosphorus trichloride.

The amount of refrigerant which should be used varies not only with the reaction temperature to be maintained but also with the refrigerant selected. The lower the temperature that is selected the greater is the quantity of a given refrigerant that must be used and vice versa. Moreover, the quantity of refrigerant required to maintain a given reaction temperature depends upon its latent heat of vaporization, the value of which is available in the literature or readily determined by one skilled in the art.

In the production of dimethyl hydrogen phosphite in which methyl chloride is the refrigerant, the latter is generally employed in a weight ratio of about 2-5 of methyl chloride to 1 of methyl alcohol. However, higher or lower ratios of methyl chloride to methyl alcohol may be employed depending upon the reaction temperature to be maintained.

As to the other refrigerants, no attempt will be made to define more specifically the quantity which should be used since this is dependent upon the above-mentioned factors and can be readily determined by those skilled in the art.

The reaction between the $C_1$–$C_3$ aliphatic alcohols and phosphorus trichloride takes place substantially instantaneously and is completed so far as it is possible to ascertain in the space of time required for passage of material through the spray nozzle. In passing through the nozzle, reaction between the above reactants occurs liberating heat which causes rapid vaporization of the refrigerant within the nozzle. The large volume of vapor thus liberated within the nozzle causes a pressure drop across the nozzle which is substantially higher than that observed for the same mass flow of liquid. The magnitude of the pressure drop depends upon the rate of evaporation of the refrigerant which in turn depends upon the vapor pressure of the refrigerant, the heat of reaction and to a lesser degree upon the degree of dilution of the reactants. When operating on a large scale using drilled metallic nozzles, the pressure drop is at least 25 lbs. per square inch and usually less than 100 lbs. per square inch. However, in practice of the instant invention, it is preferred to select a nozzle and so correlate the other conditions as to obtain a pressure drop across the nozzle of about 30–35 lbs. per square inch.

As hereinbefore indicated, the mixture of refrigerant and dialkyl hydrogen phosphite leaving the nozzle is introduced into a collecting chamber which is operated at substantially atmospheric pressure. By reason of the fine state of subdivision of the above product, any liquid or gaseous refrigerant contained therein is rapidly and substantially completely separated by vaporization. After separation from the dialkyl hydrogen phosphite, the refrigerant is recovered, compressed and liquefied for reuse in the process.

The crude dialkyl hydrogen phosphite product is conducted to a stripping tower where it is gradually heated, preferably under reduced pressure, to remove hydrogen chloride and low boiling impurities.

The stripping temperature varies with the pressure selected, the lower the pressure the lower the temperature which may be used and vice versa. At a selected operating pressure, the reboiler temperature, that is the temperature at the bottom of the stripper, is maintained at the boiling point of the dialkyl hydrogen phosphite being treated.

In the removal of hydrogen chloride and low boiling impurities from dimethyl hydrogen phosphite, a stripping pressure of from about 10 to 150 mm. and preferably from about 40 to 100 mm. of mercury is employed. The stripper reboiler temperature is conveniently maintained at the boiling point of dimethyl hydrogen phosphite at the operating pressure selected. In practice, this involves a reboiler temperature within the range of about 51° C. to about 116° C.

If desired, stripping pressures and temperatures outside the above limits may be used provided substantial decomposition of the desired dialkyl hydrogen phosphite is avoided.

The stripping operation may be carried out in a number of other ways. For example, the hydrogen chloride may be removed by adding benzene, carbon tetrachloride or another suitable solvent and then sweeping out the above acid by solvent vapors produced by distillation, preferably by vacuum distillation. Another method would be to add a solvent which is highly volatile at atmospheric pressure and then allow the vaporized solvent to remove the acid therefrom. A further method would involve introducing nitrogen or another suitable inert gas and thereby sweeping the hydrogen chloride from the product. A still further method would consist in neutralizing the product with ammonia or another compound which forms an insoluble chloride and separating the latter by filtering or centrifuging.

After removal of hydrogen chloride and low boiling impurities, the $C_1$–$C_3$ dialkyl hydrogen phosphite product is further purified by removal of high boiling impurities. This may be accomplished by dissolving the above product in a suitable inert organic solvent and fractionally distilling the ester from the solvent which retains the impurities; or by heating the crude product in contact with an inert organic material which serves not as a solvent for the impurities but merely as a heat exchange medium for effecting the distillation. In carrying out the above purification operation, any inert relatively high boiling organic heat exchanging medium or solvent which does not form an azeotropic mixture with the dialkyl hydrogen phosphite and which boils at a temperature sufficiently above the boiling point of the product to permit efficient fractionation may be employed. In practice, it is preferred to use phenylcyclohexane, but any equivalent organic heat exchanging medium which is preferably immiscible with "high boilers" and boils within the range of 90° C. to 130° C. at 25 mm. of mercury may be employed. By "high boilers" I mean the high boiling impurities left as a residue after the dialkyl hydrogen phosphites have been removed from the crude reaction product.

The distillation is effected at a temperature at least equivalent to the boiling point of the dialkyl hydrogen phosphite being separated, but below that temperature at which substantial decomposition of this product takes place. The distillation pressure may fluctuate considerably, but in practice pressures in the range of about 10 mm. to about 50 mm. of mercury are preferred.

The optimum distillation temperature and pressure will, of course, vary with the dialkyl hydrogen phosphite being distilled, but for the dimethyl derivative the most satisfactory results appear to be obtained at a temperature of about 60° C. and a pressure of about 25 mm. of mercury.

By the expression $C_1$–$C_3$ dialkyl hydrogen phosphites, I mean dimethyl hydrogen phosphite, diethyl hydrogen phosphite and diisopropyl hydrogen phosphite. Normal dipropyl hydrogen phosphite is not intended since the advantages of the present invention do not apply thereto or to dialkyl hydrogen phosphites having a greater number of carbon atoms.

The foregoing description has been limited to the reaction of the $C_1$–$C_3$ aliphatic alcohols with phosphorus trichloride, but it is to be clearly understood that phosphorus tribromide may be used in place of the trichloride.

Although the present invention has been described with reference to a particular embodiment, it will be apparent to those skilled in the art that variations and modifications of this invention can be made and that equivalents can be substituted therefor without departing from the principles and true spirit of the invention.

What I claim is:

1. The method of making dialkyl hydrogen phosphites, which comprises spraying into a collection zone, a mixture containing an aliphatic alcohol selected from the group consisting of methyl, ethyl and isopropyl alcohols, a phosphorus halide selected from the group consisting of phosphorus trichloride and phosphorus tribromide and a volatile inert organic refrigerant which does not boil above 0° C. at atmospheric pressure, said refrigerant being employed in an amount sufficient to maintain the reaction temperature within the range of about —41° C. to about 5° C.

2. The method of making dialkyl hydrogen phosphites, which comprises spraying into a collection zone, a mixture containing an aliphatic alcohol selected from the group consisting of methyl, ethyl and isopropyl alcohols, phosphorus trichloride and a volatile inert organic refrigerant which does not boil above 0° C. at atmospheric pressure, said refrigerant being employed in an amount sufficient to maintain the reaction temperature within the range of about —41° C. to about 5° C.

3. The method of making dialkyl hydrogen phosphites, which comprises spraying into a collection chamber, an aliphatic alcohol selected from the group consisting of methyl, ethyl and isopropyl alcohols, phosphorus trichloride and a volatile inert organic refrigerant which does not boil above 0° C. at atmospheric pressure, said refrigerant being employed in an amount sufficient to maintain the reaction temperature within the range of about —41° C. to about 5° C. and said reactants being employed in the molar ratio of substantially 3 moles of the alcohol to 1 mole of phosphorus trichloride.

4. The method of making dialkyl hydrogen phosphites, which comprises spraying into a collection zone, an aliphatic alcohol selected from the group consisting of methyl, ethyl and isopropyl alcohols, phosphorus trichloride and a volatile inert organic refrigerant which does not boil above 0° C. at atmospheric pressure, said reactants being employed in a molar ratio of substantially 3 moles of alcohol to 1 mole of phosphorus trichloride and said refrigerant being employed in an amount maintaining a reaction temperature within the range of about $-20°$ C. up to about 10° C.

5. The method of making dialkyl hydrogen phosphites, which comprises spraying into a collection zone at substantially atmospheric pressure, an aliphatic alcohol selected from the group consisting of methyl, ethyl and isopropyl alcohols, phosphorus trichloride and a volatile inert organic refrigerant which does not boil above 0° C. at atmospheric pressure and recovering the dialkyl hydrogen phosphite produced, said reactants being employed in a molar ratio of substantially 3 moles of alcohol to 1 mole of phosphorus trichloride and said refrigerant being used in an amount maintaining a reaction temperature of about $-20°$ C. to about $-10°$ C.

6. The method defined in claim 5, wherein the resulting product is subjected to a stripping operation to remove hydrogen chloride and low boiling impurities.

7. The method defined in claim 6, wherein the crude product is subjected to vacuum distillation while in contact with an inert relatively high boiling solvent, said distillation being carried out at a temperature at least equivalent to the boiling point of but below that point at which substantial decomposition of the dialkyl hydrogen phosphite takes place.

8. The method of making dimethyl hydrogen phosphite, which comprises mixing together methyl alcohol, phosphorus trichloride and methyl chloride and spraying the resulting product into a collection zone, said alcohol and said trichloride being employed in the molar ratio of substantially 3 moles of the alcohol to 1 mole of phosphorus trichloride and said methyl chloride being used in an amount maintaining the reaction temperature within the range of about $-41°$ C. up to about 5° C.

9. The method defined in claim 8 wherein methyl chloride is used in an amount sufficient maintain the reaction temperature at about $-20°$ C. to about $-10°$ C.

10. The method defined in claim 8 wherein methyl chloride is used in a weight ratio to methyl alcohol of from about 2 to about 5 of the former to about 1 of the latter.

11. The method of making dimethyl hydrogen phosphite, which comprises mixing together and spraying methyl alcohol, phosphorus trichloride and methyl chloride into a collection zone and heating the collected product at a temperature sufficient to remove hydrogen chloride and low boiling impurities, said methyl alcohol and said phosphorus trichloride being employed in the molar ratio of substantially 3 moles of alcohol to 1 mole of the trichloride and said methyl chloride being used in an amount sufficient to maintain the reaction temperature within the range of about $-41°$ C. to about 5° C.

12. The method of making dimethyl hydrogen phosphite, which comprises spraying together methyl alcohol, phosphorus trichloride and methyl chloride into a collection zone maintained at substantially atmospheric pressure, gradually heating the collected product to a temperature sufficient to remove hydrogen chloride and low boiling impurities, and then vacuum distilling a solution of the dimethyl hydrogen phosphite in a relatively high boiling inert organic solvent at a temperature at least equivalent to the boiling point of but below that point at which substantial decomposition of said dimethyl hydrogen phosphite takes place, said methyl alcohol and said phosphorus trichloride being employed in a molar ratio of substantially 3 moles of alcohol to 1 mole of phosphorus trichloride and said methyl chloride being employed in an amount sufficient to maintain the reaction temperature within the range of about $-20°$ C. to about $-10°$ C.

13. The method of continuously producing dialkyl hydrogen phosphites, which comprises continuously spraying into a collection zone an aliphatic alcohol selected from the group consisting of methyl, ethyl and isopropyl alcohols, phosphorus trichloride and a volatile inert organic refrigerant which does not boil above 0° C. at atmospheric pressure, heating the collected product to a temperature sufficient to remove hydrogen chloride and low boiling impurities and continuously distilling a solution of the resulting crude product in a relatively high boiling inert solvent at a temperature above the boiling point but below that point at which substantial decomposition of the dialkyl hydrogen phosphite occurs, said aliphatic alcohol and phosphorus trichloride being employed in a molar ratio of substantially 3 moles of the alcohol to 1 mole of the phosphorus trichloride and said refrigerant being employed in an amount maintaining the reaction temperature within the range of about $-41°$ C. up to about 5° C.

DAVID H. CHADWICK.

REFERENCES CITED

The following references are of record in the file of this patent:

UNITED STATES PATENTS

| Number | Name | Date |
|---|---|---|
| 2,175,509 | Rogers et al. | Oct. 10, 1939 |
| 2,187,244 | Mills | Jan. 16, 1940 |
| 2,214,254 | Mills et al. | Sept. 10, 1940 |
| 2,426,691 | Jenkins | Sept. 2, 1947 |